United States Patent
Xu et al.

(10) Patent No.: US 10,285,128 B2
(45) Date of Patent: May 7, 2019

(54) METHOD AND APPARATUS FOR WAKING UP DEVICES IN BATCHES, AND DEVICE

(71) Applicant: Huawei Technologies Co., Ltd., Shenzhen (CN)

(72) Inventors: Gaofeng Xu, Shenzhen (CN); Zhilong Yang, Shenzhen (CN); Chuan Lin, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 189 days.

(21) Appl. No.: 15/615,260

(22) Filed: Jun. 6, 2017

(65) Prior Publication Data

US 2017/0273024 A1 Sep. 21, 2017

Related U.S. Application Data

(63) Continuation of application No. PCT/CN2015/083579, filed on Jul. 8, 2015.

(30) Foreign Application Priority Data

Dec. 31, 2014 (CN) .......................... 2014 1 0856309

(51) Int. Cl.
*H04W 52/02* (2009.01)
*G06F 13/12* (2006.01)
(Continued)

(52) U.S. Cl.
CPC ...... *H04W 52/0235* (2013.01); *G06F 13/128* (2013.01); *H04L 67/145* (2013.01);
(Continued)

(58) Field of Classification Search
CPC .................................................. H04W 52/0235
See application file for complete search history.

(56) References Cited

U.S. PATENT DOCUMENTS

| | | | | |
|---|---|---|---|---|
| 2006/0100002 A1* | 5/2006 | Luebke | ................. | G06F 3/0362 455/574 |
| 2014/0148100 A1* | 5/2014 | Kim | .................. | H04W 72/0406 455/41.2 |
| 2015/0245290 A1* | 8/2015 | Liu | ................... | H04W 52/0216 370/311 |

FOREIGN PATENT DOCUMENTS

| | | |
|---|---|---|
| CN | 101218801 A | 7/2008 |
| CN | 102307147 A | 1/2012 |

(Continued)

OTHER PUBLICATIONS

Machine Translation and Abstract of Chinese Publication No. CN103873195, Jun. 18, 2014, 10 pages.

(Continued)

*Primary Examiner* — Ankur Jain
(74) *Attorney, Agent, or Firm* — Conley Rose, P.C.

(57) ABSTRACT

A method for waking up devices in batches where the method includes generating, by a coordinator, a wake-up broadcast frame, where the wake-up broadcast frame includes a wake-up indication field, which instructs multiple devices in a low-rate wireless personal area network (LR-WPAN) to keep in a running state, and sending, by the coordinator, the wake-up broadcast frame at a time interval T2 within duration T1. Hence, the coordinator can wake up some devices directionally using the wake-up indication field in the wake-up broadcast frame. Therefore, resource utilization and wake-up efficiency of the coordinator are improved such that channel utilization and performance of the LR-WPAN are improved.

20 Claims, 5 Drawing Sheets

A coordinator generates a wake-up broadcast frame, where the wake-up broadcast frame includes a wake-up indication field, and the wake-up indication field instructs multiple devices in an LR-WPAN to keep in a running state — 101

The coordinator sends the wake-up broadcast frame at a time interval T2 within duration T1, where T1 is not less than a sum of T3 and T4, T2 is not greater than T4, T3 is maximum hibernation duration of the multiple devices, and T4 is a minimum running time window of the multiple devices — 102

(51) Int. Cl.
 H04L 29/08 (2006.01)
 H04W 84/12 (2009.01)
 H04W 84/18 (2009.01)
(52) U.S. Cl.
 CPC .... *H04W 52/0229* (2013.01); *H04W 52/0216* (2013.01); *H04W 84/12* (2013.01); *H04W 84/18* (2013.01); *Y02D 70/00* (2018.01); *Y02D 70/144* (2018.01)

(56) References Cited

FOREIGN PATENT DOCUMENTS

| | | |
|---|---|---|
| CN | 102938928 A | 2/2013 |
| CN | 103873195 A | 6/2014 |
| CN | 104202801 A | 12/2014 |
| KR | 20070029927 A | 3/2007 |
| WO | 2007004854 A1 | 1/2007 |
| WO | 2014071891 A1 | 5/2014 |

OTHER PUBLICATIONS

Machine Translation and Abstract of Korean Publication No. KR20070029927, Mar. 15, 2007, 16 pages.
"Part 15.4: Low-Rate Wireless Personal Area Networks (LR-WPANs)," IEEE Computer Society, IEEE Std 802.15.4, Sep. 5, 2011, 314 pages.
Foreign Communication From a Counterpart Application, PCT Application No. PCT/CN2015/083579, English Translation of International Search Report dated Oct. 12, 2015, 2 pages.
Foreign Communication From a Counterpart Application, PCT Application No. PCT/CN2015/083579, English Translation of Written Opinion dated Oct. 12, 2015, 5 pages.
Machine Translation and Abstract of International Publication No. WO2014071891, May 15, 2014, 4 pages.
Fumihide, K., et al., "Wireless Network Research Institute, Smart Wireless Laboratory NICT," XP068037418, IEEE 802. 11-11/1269r2, Sep. 19, 2011, 36 pages.
Foreign Communication From a Counterpart Application, European Application No. 15874818.6, Extended European Search Report dated Oct. 12, 2017, 10 pages.
Machine Translation and Abstract of Chinese Publication No. CN102307147, Jan. 4, 2012, 14 pages.
Machine Translation and Abstract of Chinese Publication No. CN104202801, Dec. 10, 2014, 12 pages.
Pande, H., et al, "Various Ways to Implement Energy Efficient WiseMAC Protocol for Wireless Sensor Network," IEEE International Conference on Systems, Man, and Cybernetics, Jan. 27, 2014, pp. 22-25.
Foreign Communication From a Counterpart Application, Chinese Application No. 201410856309.0, Chinese Search Report dated Dec. 29, 2018, 3 pages.
Foreign Communication From a Counterpart Application, Chinese Application No. 201410856309.0, Chinese Office Action dated Jan. 11, 2019, 6 pages.

* cited by examiner

| 0 | 1 | 2 | 3 | 4 | 5 | 6 | 7 | 8 | 9 | 0 | 1 | 2 | 3 | 4 | 5 |
|---|---|---|---|---|---|---|---|---|---|---|---|---|---|---|---|
| ID: 0x01 | ID: 0x02 | ID: 0x03 | ID: 0x04 | ID: 0x05 | ID: 0x06 | ID: 0x07 | ID: 0x08 | ID: 0x09 | ID: 0xA0 | ID: 0xA1 | ID: 0xA2 | ID: 0xA3 | ID: 0xA4 | ID: 0xA5 | ID: 0xA6 |
| ID: 0xA7 | ID: 0xA8 | ID: 0xA9 | ID: 0xAA | ID: 0xAB | ID: 0xAC | ID: 0xAD | ID: 0xAE | ID: 0xAF | ID: 0xB0 | ID: 0xB1 | ID: 0xB2 | ID: 0xB3 | ID: 0xB4 | ID: 0xB5 | ID: 0xB6 |
| ⋮ | | | | | | | | | | | | | | | |
| ID: 0xE7 | ID: 0xE8 | ID: 0xE9 | ID: 0xEA | ID: 0xEB | ID: 0xEC | ID: 0xED | ID: 0xEE | ID: 0xEF | ID: 0xF0 | ID: 0xF1 | ID: 0xF2 | ID: 0xF3 | ID: 0xF4 | ID: 0xF5 | ID: 0xF6 |
| ID: 0xF7 | ID: 0xF8 | ID: 0xF9 | ID: 0xFA | ID: 0xFB | ID: 0xFC | ID: 0xFD | ID: 0xFE | | | | | | | | |

FIG. 2A

| 0 1 2 3 | 4 5 6 7 | 8 9 0 1 2 3 4 5 |
|---|---|---|
| Type | Length | ID: 0x11 |
| ID: 0x15 | | ID: 0x43 |
| ID: 0x78 | | |
FIG. 2B
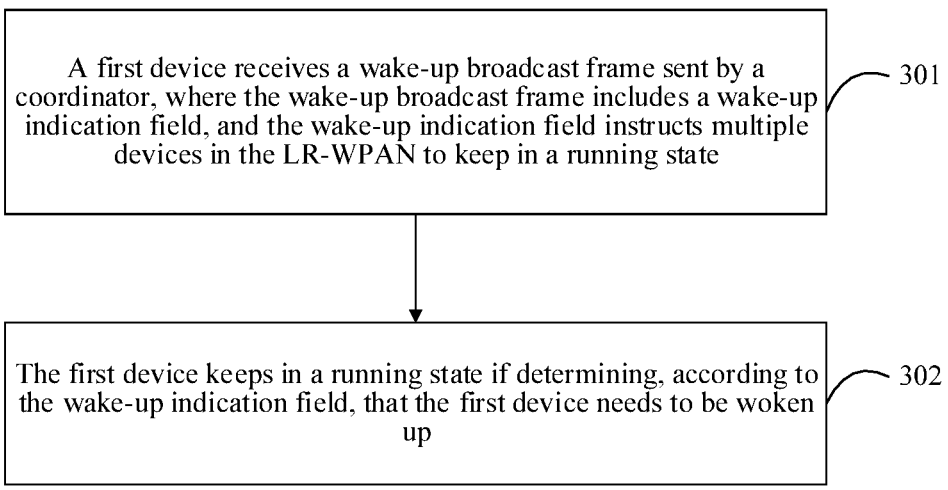
FIG. 3
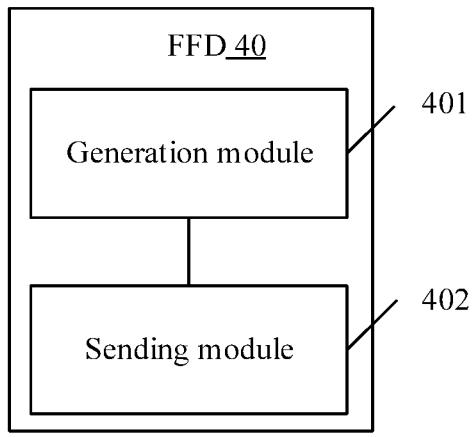
FIG. 4

METHOD AND APPARATUS FOR WAKING UP DEVICES IN BATCHES, AND DEVICE

CROSS-REFERENCE TO RELATED APPLICATIONS

This application is a continuation of International Patent Application No. PCT/CN2015/083579 filed on Jul. 8, 2015, which claims priority to Chinese Patent Application No. 201410856309.0 filed on Dec. 31, 2014. The disclosures of the aforementioned applications are hereby incorporated by reference in their entireties.

TECHNICAL FIELD

The present disclosure relates to the communications field, and in particular, to a method and an apparatus for waking up devices in batches, and a device.

BACKGROUND

A low-rate wireless personal area network (LR-WPAN) refers to a set of devices that communicate with each other within an area using a same wireless channel and in compliance with the Institute of Electrical and Electronics Engineers (IEEE) 802.15.4 standard, and the LR-WPAN is also referred to as an IEEE 802.15.4 network. The IEEE 802.15.4 standard defines a physical layer and Media Access Control in the LR-WPAN.

Based on communication capabilities, devices in the LR-WPAN are classified into a full-function device (FFD) and a reduced-function device (RFD). Communication can be directly performed between FFDs or between an FFD and an RFD, but cannot be directly performed between RFDs. An RFD can communicate only with an FFD, and forwards data using an FFD. In each LR-WPAN, at least one FFD is required to serve as a network coordinator. In addition to direct participation in applications, the coordinator is also responsible for tasks in the LR-WPAN, such as member identity management, link status information management, and packet forwarding. An RFD is mainly used for relatively simple applications, for example, a light switch and a passive infrared sensor. The RFD needs to transmit a relatively small volume of data, and occupies few transmission resources and communication resources. Therefore, a low-cost implementation solution can be used for the RFD.

To satisfy an energy-saving requirement, generally, each time after a low power-consumption RFD hibernates for a period, the RFD starts a quite short running time window for running. The RFD enters a hibernation state again if not receiving a wake-up packet within a running time window. For example, the RFD hibernates for 5 minutes, and then runs for 100 milliseconds, that is, hibernation duration is 5 minutes, and a running time window is 100 milliseconds. The RFD hibernates for 5 minutes and runs for 100 milliseconds, and then hibernates for 5 minutes and runs for 100 milliseconds in a periodical manner. If control needs to be performed on the RFD, for example, upgrading or data querying, the RFD needs to be woken up before the RFD runs. Conventional wake-up mechanisms include the following two types.

Wake-up in unicast mode: A coordinator sends a unicast frame to wake up an RFD that needs to be controlled. Because of a quite short running time window of an RFD, it cannot be ensured that one RFD can be woken up after a unicast frame is sent once. The coordinator may wake up one RFD only after sending a unicast frame for multiple times. If a relatively large quantity of RFDs need to be controlled, a quite long time may be taken, and wake-up efficiency is rather low.

Wake-up in broadcast mode: A coordinator sends a broadcast frame to wake up a device. Because all devices share a channel, all the devices in an LR-WPAN can receive the broadcast frame sent by the coordinator, and need to respond to the broadcast frame. In an LR-WPAN using a star networking mode, a response conflict between broadcast frames is easily caused. Therefore, the coordinator cannot receive a response from an RFD that needs to be controlled, and an RFD that does not need to be controlled may also be woken up. As a result, power consumption is increased, and energy-saving cannot be achieved.

SUMMARY

Embodiments of the present disclosure provide a method and an apparatus for waking up devices in batches, and a device. A coordinator in an LR-WPAN periodically sends a wake-up broadcast frame including a wake-up indication field, to wake up a batch of RFDs that needs to be controlled in the LR-WPAN, thereby preventing a device that does not need to be controlled from being woken up. In this way, energy-saving implemented on a device can be ensured, and wake-up efficiency and network communication performance can be improved.

According to a first aspect, a method for waking up devices in batches is provided, applied to an LR-WPAN, where the method includes generating, by a coordinator, a wake-up broadcast frame, where the wake-up broadcast frame includes a wake-up indication field, and the wake-up indication field instructs multiple devices in the LR-WPAN to keep in a running state, and sending, by the coordinator, the wake-up broadcast frame at a time interval T2 within duration T1, where T1 is not less than a sum of T3 and T4, T2 is not greater than T4, T3 is maximum hibernation duration of the multiple devices, and T4 is a minimum running time window of the multiple devices.

In a first possible implementation manner of the first aspect, the wake-up indication field includes a wake-up indication bit corresponding to each identifier (ID) that can be allocated to the devices in the LR-WPAN, or the wake-up indication field is in type-length-value (TLV) format and includes IDs of the multiple devices.

According to the first aspect or the first possible implementation manner of the first aspect, in a second possible implementation manner of the first aspect, before generating, by a coordinator, a wake-up broadcast frame, the method further includes determining that the wake-up indication field includes the wake-up indication bit corresponding to each ID within the ID value range of the devices in the LR-WPAN when a quantity of the multiple devices is greater than a preset threshold, or determining that the wake-up indication field is in TLV format and includes the IDs of the multiple devices when a quantity of the multiple devices is not greater than a preset threshold.

According to any one of the first aspect or the first or the second possible implementation manner of the first aspect, in a third possible implementation manner of the first aspect, the wake-up broadcast frame further includes a controlled duration t, and the controlled duration t is not less than T4, and before generating a wake-up broadcast frame, the method further includes obtaining the controlled duration t, where the controlled duration t instructs the multiple devices to keep running for the controlled duration t.

According to the third possible implementation manner of the first aspect, in a fourth possible implementation manner of the first aspect, obtaining the controlled duration t includes obtaining the controlled duration t according to preset service control duration and the quantity of the multiple devices, where the controlled duration t is a product of the preset service control duration and the quantity of the multiple devices.

According to any one of the first aspect or the first to the fourth possible implementation manners of the first aspect, in a fifth possible implementation manner of the first aspect, the method further includes controlling, by the coordinator, the multiple devices after the duration T1 expires.

According to a second aspect, a method for waking up devices in batches is provided, applied to an LR-WPAN, where the method includes receiving, by a first device, a wake-up broadcast frame sent by a coordinator, where the wake-up broadcast frame includes a wake-up indication field, and the wake-up indication field instructs multiple devices in the LR-WPAN to keep in a running state, and keeping, by the first device, in a running state starting from the last time when the first device receives the wake-up broadcast frame and if determining, according to the wake-up indication field, that the first device needs to be woken up.

In a first possible implementation manner of the second aspect, the method may further include discarding, by the first device, the wake-up broadcast frame if determining, according to the wake-up indication field, that the first device does not need to be woken up, and entering a hibernation state again after a running time window of the first device expires.

According to the second aspect or the first possible implementation manner of the second aspect, in a second possible implementation manner of the second aspect, the wake-up indication field includes a wake-up indication bit corresponding to each ID that can be allocated to the devices in the LR-WPAN, or the wake-up indication field is in TLV format and includes IDs of the multiple devices.

According to any one of the second aspect or the first or the second possible implementation manner of the second aspect, in a third possible implementation manner of the second aspect, the wake-up broadcast frame further includes a controlled duration t, and the controlled duration t is not less than a minimum running time window of the multiple devices, and the method further includes obtaining the controlled duration t from the wake-up broadcast frame.

According to any one of the second aspect or the first to the third possible implementation manners of the second aspect, in a fourth possible implementation manner of the second aspect, the method further includes entering, by the first device, a hibernation state again when the running time window of the first device or the controlled duration t expires, and if the first device is not in communication.

According to a third aspect, an FFD is provided, applied to an LR-WPAN, where the FFD includes a generation module configured to generate a wake-up broadcast frame, where the wake-up broadcast frame includes a wake-up indication field, and the wake-up indication field instructs multiple devices in the LR-WPAN to keep in a running state, and a sending module configured to send the wake-up broadcast frame at a time interval T2 within duration T1, where T1 is not less than a sum of T3 and T4, T2 is not greater than T4, T3 is maximum hibernation duration of the multiple devices, and T4 is a minimum running time window of the multiple devices.

In a first possible implementation manner of the third aspect, the wake-up indication field includes a wake-up indication bit corresponding to each ID that can be allocated to the devices in the LR-WPAN, or the wake-up indication field is in TLV format and includes IDs of the multiple devices.

According to the third aspect or the first possible implementation manner of the third aspect, in a second possible implementation manner of the third aspect, the generation module is further configured to determine that the wake-up indication field includes the wake-up indication bit corresponding to each ID within the ID value range of the devices in the LR-WPAN when a quantity of the multiple devices is greater than a preset threshold, or determine that the wake-up indication field is in TLV format and includes the IDs of the multiple devices when a quantity of the multiple devices is not greater than a preset threshold.

According to any one of the third aspect or the first or the second possible implementation manner of the third aspect, in a third possible implementation manner of the third aspect, the wake-up broadcast frame further includes a controlled duration t, and the controlled duration t is not less than T4, and the generation module is further configured to obtain the controlled duration t, where the controlled duration t instructs the multiple devices to keep running for the controlled duration t.

According to the third possible implementation manner of the third aspect, in a fourth possible implementation manner of the third aspect, the generation module is further configured to obtain the controlled duration t according to preset service control duration and the quantity of the multiple devices, where the controlled duration t is a product of the preset service control duration and the quantity of the multiple devices.

According to any one of the third aspect or the first to the fourth possible implementation manners of the third aspect, in a fifth possible implementation manner of the third aspect, the FFD further includes a control processing module configured to control the multiple devices after the duration T1 expires.

According to a fourth aspect, an apparatus for waking up devices in batches is provided, applied to an LR-WPAN, where the apparatus includes a receiving module configured to receive a wake-up broadcast frame sent by a coordinator, where the wake-up broadcast frame includes a wake-up indication field, and the wake-up indication field instructs multiple devices in the LR-WPAN to keep in a running state, and the apparatus for waking up devices in batches is deployed on a first device of the multiple devices, and a processing module configured to enable the first device to keep in a running state starting from the last time when the wake-up broadcast frame is received, and if determining, according to the wake-up indication field, that the first device needs to keep in a running state.

In the first possible implementation manner of the fourth aspect, the processing module is further configured to discard the wake-up broadcast frame if determining, according to the wake-up indication field, that the first device does not need to keep in a running state, and enable the first device to enter a hibernation state again after a running time window of the first device expires.

According to the fourth aspect or the first possible implementation manner of the fourth aspect, in a second possible implementation manner of the fourth aspect, the wake-up indication field includes a wake-up indication bit corresponding to each ID that can be allocated to the devices in the LR-WPAN, or the wake-up indication field is in TLV format and includes IDs of the multiple devices.

According to any one of the fourth aspect or the first or the second possible implementation manner of the fourth aspect, in a third possible implementation manner of the fourth aspect, the wake-up broadcast frame further includes a controlled duration t, and the controlled duration t is not less than a minimum running time window of the multiple devices, and the processing module is further configured to obtain the controlled duration t from the wake-up broadcast frame.

According to any one of the fourth aspect or the first to the third possible implementation manners of the fourth aspect, in a fourth possible implementation manner of the fourth aspect, the processing module is further configured to enable the first device to enter a hibernation state again when the running time window of the first device or the controlled duration t expires, and if the first device is not in communication.

According to a fifth aspect, an LR-WPAN is provided, including a coordinator and multiple devices, where the coordinator is the FFD according to any one of the third aspect or the possible implementation manners of the third aspect, and each of the multiple devices includes the apparatus for waking up devices in batches according to any one of the fourth aspect or the possible implementation manners of the fourth aspect.

According to the technical solutions provided in the embodiments of the present disclosure, a coordinator generates a wake-up broadcast frame including a wake-up indication field, and instructs, using the wake-up indication field, multiple devices in an LR-WPAN to keep in a running state, to wake up some devices in the LR-WPAN using a broadcast wake-up mechanism similar to a multicast mode. In this way, resource utilization and wake-up efficiency of the coordinator can be improved compared with a conventional unicast or broadcast mode. In addition, each of the multiple devices keeps running for controlled duration t according to the wake-up indication field without making a response. In this way, a broadcast response conflict between the multiple devices can be avoided, and resource utilization of each device can be improved such that channel utilization and performance of the LR-WPAN are improved.

BRIEF DESCRIPTION OF DRAWINGS

FIG. 2A is a schematic structural diagram of a wake-up indication field according to an embodiment of the present disclosure;

FIG. 2B is a schematic structural diagram of another wake-up indication field according to an embodiment of the present disclosure;

FIG. 3 is a flowchart of another method for waking up devices in batches according to an embodiment of the present disclosure;

FIG. 4 is a schematic structural diagram of an FFD according to an embodiment of the present disclosure;

DESCRIPTION OF EMBODIMENTS

To make the objectives, features and advantages of the embodiments of the present disclosure more comprehensible, the following further describes the embodiments of the present disclosure in detail with reference to the accompanying drawings and specific implementation manners.

Figure 1:
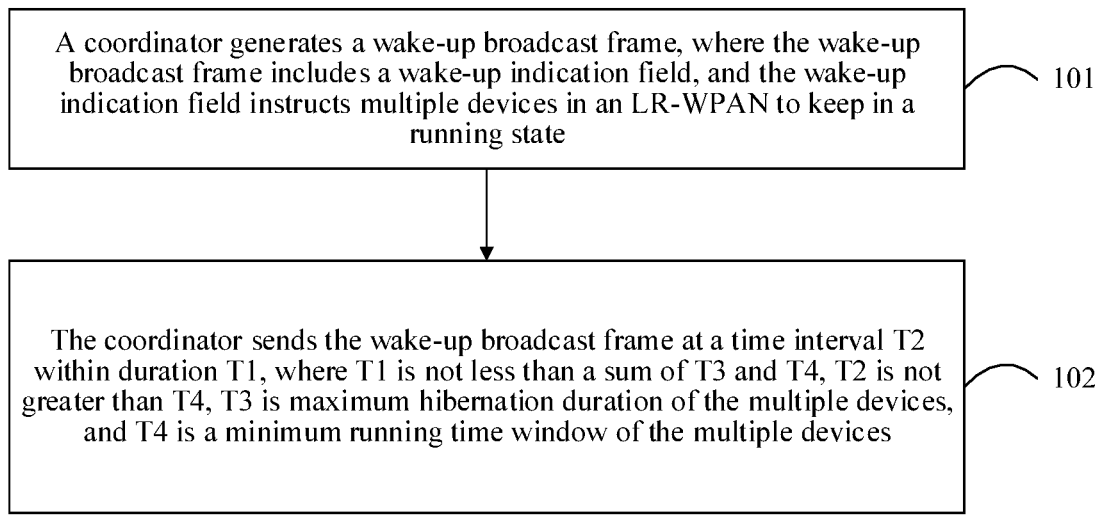
FIG. 1 is a flowchart of a method for waking up devices in batches according to an embodiment of the present disclosure.

Referring to FIG. 1, FIG. 1 is a flowchart of a method for waking up devices in batches according to an embodiment of the present disclosure. The method is applied to an LR-WPAN using a star networking mode, and the method includes the following steps.

Step 101: A coordinator generates a wake-up broadcast frame, where the wake-up broadcast frame includes a wake-up indication field, and the wake-up indication field instructs multiple devices in the LR-WPAN to keep in a running state.

After the coordinator sends the wake-up broadcast frame, all other devices in the LR-WPAN different from the coordinator receive the wake-up broadcast frame. In this embodiment of the present disclosure, the wake-up broadcast frame generated by the coordinator includes a wake-up indication field, which wakes up the multiple devices in the LR-WPAN directionally, and instructs the multiple devices to keep in a running state. Further, the multiple devices may respectively keep running within corresponding running time windows, or may keep running according to a preset wake-up holding time. The preset wake-up holding time may be preconfigured on each device in the LR-WPAN, and may be related to a service deployed in the LR-WPAN. Then, the coordinator may control the multiple devices in order to resolve a problem that energy-saving cannot be achieved in an existing broadcast mode in which a device that does not need to be controlled is woken up.

The multiple devices are generally RFDs, or certainly may be FFDs, for example, FFDs having a relatively high energy-saving requirement.

Generally, an ID is allocated to each device in the LR-WPAN, and is used for communication in the LR-WPAN and uniquely identifies the device in the LR-WPAN. According to a scale and deployment of the LR-WPAN, a bit quantity of an ID may be 16 bits, 8 bits, or the like. That a bit quantity of an ID of a device in the LR-WPAN is 16 bits is used as an example. 0x0000 is an invalid ID, and 0xFFFF is a broadcast ID. A value range of an ID that can be allocated to a device in the LR-WPAN is 0x0001 to 0xFFFE, that is, each ID within the value range can be allocated to a device in the LR-WPAN. An ID of the coordinator may be set fixedly, for example, 0x0001. IDs of other devices different from the coordinator may be automatically allocated by the coordinator, or may be manually configured. Assuming that the ID of the coordinator is 0x0001, values of the IDs of the other devices in the LR-WPAN different from the coordinator range from 0x0002 to 0xFFFE.

In a first possible implementation manner, the wake-up indication field includes a wake-up indication bit corresponding to each ID that can be allocated to the devices in the LR-WPAN. A quantity of wake-up indication bits is the same as a quantity of IDs within the value range of the IDs that can be allocated to the devices in the LR-WPAN. Further, if the bit quantity of the ID of the device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the 254$^{th}$ bits are respectively corresponding to the IDs 0x01 to 0xFE, that is, the first bit corresponds to an ID 0x01, the second bit corresponds to an ID 0x02, . . . , and the 254$^{th}$ bit corresponds to an ID 0xFE. Further, a wake-up indication bit whose value is 1 may indicate a device corresponding to the wake-up indication bit and that needs to be woken up, and a wake-up indication bit whose value is 0 may indicate a device corresponding to the wake-up indication bit and that does not need to be woken up. A wake-up indication bit corresponding to the ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may indicate a device that does not need to be woken up. A wake-up indication bit corresponding to the ID of the coordinator may be always set to 1. Alternatively, the wake-up indication field may include only 253 wake-up indication bits if the ID of the coordinator is set to 0x01 fixedly. The first to the 253$^{th}$ bits are respectively corresponding to IDs 0x02 to 0xFE.

In a second possible implementation manner, the wake-up indication field is in TLV format and includes IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

Before step 101, the method may further include determining, by the coordinator, the IDs of the multiple devices.

The coordinator generates the wake-up broadcast frame according to the IDs of the multiple devices. The foregoing first possible implementation manner or the foregoing second possible implementation manner is used for the wake-up indication field in the wake-up broadcast frame.

Further, the coordinator may support both the foregoing first possible implementation manner and the foregoing second possible implementation manner. Before the coordinator generates and sends the wake-up broadcast frame, the method further includes determining, by the coordinator, the wake-up indication field according to a preset condition, that is, choosing to use the foregoing first possible implementation manner or the foregoing second possible implementation manner. The preset condition includes setting the first possible implementation manner, that is, determining that the wake-up indication field includes the wake-up indication bit corresponding to each ID within the ID value range of the devices in the LR-WPAN when a quantity of the multiple devices that need to be woken up is greater than a preset threshold, and setting the second possible implementation manner, that is, determining that the wake-up indication field is in TLV format and includes the IDs of the multiple devices when a quantity of the multiple devices that need to be woken up is not greater than a preset threshold. The preset threshold may be $2^n/n$, where n is a bit quantity of an ID in the LR-WPAN. For example, the preset threshold is set to 32 when the bit quantity of the ID in the LR-WPAN is 8 bits. In this case, the first possible implementation manner is set when the quantity of the devices that need to be woken up is greater than 32. The second possible implementation manner is set when the preset threshold is set to less than or equal to 32. In this way, when few devices need to be woken up, TLV directly carry the IDs of the devices that need to be woken up such that a length of the broadcast frame can be reduced, channel resource occupation can be reduced, and device processing efficiency can also be improved. Certainly, the preset threshold may not be set to $2^n/n$, and may also be set to a larger or smaller numeric value.

Optionally, the coordinator generating the wake-up broadcast frame according to the IDs of the multiple devices includes generating, by the coordinator, the wake-up broadcast frame according to the IDs of the multiple devices and the preset condition. The foregoing first possible implementation manner or the foregoing second possible implementation manner is set for the wake-up indication field according to the preset condition.

Step 102: The coordinator sends the wake-up broadcast frame at a time interval T2 within duration T1, where T1 is not less than a sum of T3 and T4, T2 is not greater than T4, T3 is maximum hibernation duration of the multiple devices, and T4 is a minimum running time window of the multiple devices.

A low power-consumption RFD hibernates for a long time and runs for a short time, and the coordinator does not determine when each of the multiple devices hibernates or runs. Therefore, to ensure that all of the multiple devices can receive the wake-up broadcast frame and can be woken up, the coordinator first determines the duration T1 and the time interval T2 according to the multiple devices. T1 is not less than the sum of T3 and T4, T2 is not greater than T4, T3 is the maximum hibernation duration of the multiple devices, and T4 is the minimum running time window of the multiple devices. Then, the coordinator sends the wake-up broadcast frame at the time interval T2 within the duration T1. In this way, regardless of when each of the multiple devices runs, it can be ensured that the multiple devices receive the wake-up broadcast frame within the running time windows and are woken up.

For example, the coordinator needs to control 200 devices. Maximum hibernation duration of the 200 devices is 5 minutes, that is, T3 is 5 minutes. A minimum running time window of the 200 devices is 50 milliseconds, that is, T4 is 50 milliseconds. In this case, the duration T1 in which the coordinator sends the wake-up broadcast frame is not less than the sum of T3 and T4, for example, the duration T1 may be 6 minutes. The time interval T2 for the coordinator to send the wake-up broadcast frame is not greater than T4, for example, the time interval T2 may be 40 milliseconds. The coordinator continually sends the wake-up broadcast frame at the time interval T2 (40 milliseconds) within the duration T1 (6 minutes), which can ensure that the multiple devices receive the wake-up broadcast frame within the running time windows and are woken up.

Further, the method may include controlling, by the coordinator, the multiple devices when the duration T1 expires. The coordinator may perform batch control on the multiple devices in broadcast mode, for example, performing batch upgrading or querying for data in batches, or the coordinator may separately control the multiple devices in unicast mode, for example, updating data.

Optionally, the wake-up broadcast frame further includes a controlled duration t when the coordinator needs to separately control the multiple devices in unicast mode. The controlled duration t instructs the multiple devices to keep running for the controlled duration t, and the controlled duration t is not less than T4. Before generating a wake-up broadcast frame, the method further includes obtaining, by the coordinator, the controlled duration t.

The controlled duration t is related to service control duration of a service of the multiple devices that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN.

Further, obtaining the controlled duration t includes obtaining the controlled duration t according to the preset service control duration and the quantity of the multiple devices, where the controlled duration t is the product of the preset service control duration and the quantity of the multiple devices.

After waking up the multiple devices, the coordinator may control the multiple devices subsequently, to ensure that after the duration T1, all the multiple devices keep in a running state when the coordinator controls the multiple devices. When waking up the multiple devices using the wake-up broadcast frame, the coordinator further needs to instruct the multiple devices to keep running for the controlled duration tin order to avoid the devices hibernate again, thereby avoiding multiple times of wake-up and a waste of resources, and improving wake-up efficiency of the coordinator.

Optionally, if a device of the multiple devices is still not woken up, the coordinator uses the device of the multiple devices still not woken up as a new to-be-controlled device, to perform the foregoing steps 101 and 102.

According to the method for waking up devices in batches provided in this embodiment of the present disclosure, a coordinator in an LR-WPAN sends, at a time interval T2 within duration T1, a wake-up broadcast frame including a wake-up indication field, to wake up multiple devices directionally using a broadcast wake-up mechanism similar to a multicast mode, and to instruct the multiple devices to keep in a running state such that the coordinator controls the multiple devices. In this way, a wake-up time can be shortened and wake-up efficiency can be improved compared with a unicast or broadcast mode. In addition, a device that does not need to be controlled is prevented from being woken up in broadcast mode, and energy-saving implemented on a device is ensured such that channel utilization and performance of the LR-WPAN are improved.

Based on a same inventive concept, on the basis of the method for waking up devices in batches that is performed by the coordinator and shown in FIG. 1, FIG. 3 is a flowchart of another method for waking up devices in batches according to an embodiment of the present disclosure. The method shown in FIG. 3 is applied to an LR-WPAN using a star networking mode, and the method includes the following steps.

Step 301: A first device receives a wake-up broadcast frame sent by a coordinator, where the wake-up broadcast frame includes a wake-up indication field, and the wake-up indication field instructs multiple devices in the LR-WPAN to keep in a running state.

Generally, an ID is allocated to each device in the LR-WPAN, and is used for communication in the LR-WPAN and uniquely identifies the device in the LR-WPAN. According to a scale and deployment of the LR-WPAN, a bit quantity of an ID may be 16 bits, 8 bits, or the like. That a bit quantity of an ID of a device in the LR-WPAN is 16 bits is used as an example. 0x0000 is an invalid ID, and 0xFFFF is a broadcast ID. A value range of an ID that can be allocated to a device in the LR-WPAN is 0x0001 to 0xFFFE, that is, each ID within the value range can be allocated to a device in the LR-WPAN. An ID of the coordinator may be set fixedly, for example, 0x0001. IDs of other devices different from the coordinator may be automatically allocated by the coordinator, or may be manually configured. Assuming that the ID of the coordinator is 0x0001, values of the IDs of the other devices in the LR-WPAN different from the coordinator range from 0x0002 to 0xFFFE.

In a first possible implementation manner, the wake-up indication field includes a wake-up indication bit corresponding to each ID that can be allocated to the devices in the LR-WPAN. A quantity of wake-up indication bits is the same as a quantity of IDs within the value range of the IDs that can be allocated to the devices in the LR-WPAN. Further, if the bit quantity of the ID of the device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the $254^{th}$ bits are respectively corresponding to the IDs 0x01 to 0xFE, that is, the first bit corresponds to an ID 0x01, the second bit corresponds to an ID 0x02, . . . , and the $254^{th}$ bit corresponds to an ID 0xFE. Further, a wake-up indication bit whose value is 1 may be used to indicate a device corresponding to the wake-up indication bit and that needs to be woken up, and a wake-up indication bit whose value is 0 may be used to indicate a device corresponding to the wake-up indication bit and that does not need to be woken up. A wake-up indication bit corresponding to the ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may be used to indicate a device that does not need to be woken up. A wake-up indication bit corresponding to the ID of the coordinator may be always set to 1. Alternatively, the wake-up indication field may include only 253 wake-up indication bits if the ID of the coordinator is set to 0x01 fixedly. The first to the $253^{th}$ bits are respectively corresponding to IDs 0x02 to 0xFE.

In a second possible implementation manner, the wake-up indication field is in TLV format and includes IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

Optionally, the wake-up broadcast frame further includes a controlled duration t, which instructs the multiple devices to keep running for the controlled duration t. The controlled duration t is generally not less than a minimum running time window of the multiple devices. In this embodiment of the present disclosure, when the coordinator needs to separately control the multiple devices in unicast mode, the wake-up broadcast frame further includes the controlled duration t. The controlled duration t is related to service control duration of a service that is of the multiple devices and that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN. Certainly, in another case, the coordinator may alternatively add the controlled duration t to the wake-up broadcast frame.

Step 302: The first device keeps in a running state if determining, according to the wake-up indication field, that the first device needs to be woken up.

Further, the first device may keep running within a running time window of the first device, or may keep running according to a preset wake-up holding time. The preset wake-up holding time may be preconfigured on each device in the LR-WPAN, and may be related to a service deployed in the LR-WPAN network.

Optionally, the first device keeps running for a controlled duration t when the wake-up broadcast frame further includes the controlled duration t. The method further includes obtaining, by the first device, the controlled duration t from the wake-up broadcast frame.

As shown in FIG. 1, the coordinator continually sends the wake-up broadcast frame at a time interval T2 within duration T1. Therefore, after the first device receives the wake-up broadcast frame for the first time and is woken up, the first device may receive the wake-up broadcast frame again at each time interval T2. Each time the first device receives the wake-up broadcast frame, the first device refreshes a timer, and performs timing on the running time window of the first device or the controlled duration t again. In this way, it can be ensured that the first device keeps running within the running time window of the first device or for the controlled duration t such that the coordinator controls the first device after the duration T1 expires.

The method further includes discarding the wake-up broadcast frame if determining, according to the wake-up indication field, that the first device does not need to be woken up, and entering a hibernation state again after the running time window of the first device expires.

Further, the first device determines, according to the wake-up indication field in the wake-up broadcast frame, whether the first device needs to be woken up. The first device may discard the wake-up broadcast frame if determining, according to the wake-up indication field, that the first device does not need to be woken up, and enter a hibernation state again after the running time window expires. The first device keeps in a running state and does not need to make a response if determining, according to the wake-up indication field, that the first device needs to be woken up. In this way, a broadcast response conflict between the multiple devices can be avoided, and resource utilization of the devices can be improved.

The method further includes waiting, by the first device within the running time window of the first device or the controlled duration t, for control to be performed by the coordinator, for example, upgrading, time synchronization, data querying, or data updating.

The method further includes entering, by the first device, a hibernation state again when the running time window of the first device or the controlled duration t expires, and if the first device is not in communication. After the last time when the first device receives the wake-up broadcast frame, when the running time window of the first device or the controlled duration t expires, if the first device is not in communication, the first device enters a hibernation state again.

In this embodiment of the present disclosure, after receiving a wake-up broadcast frame sent by a coordinator in an LR-WPAN, the first device determines, according to a wake-up indication field in the wake-up broadcast frame, whether the first device needs to keep in a running state. The first device keeps running for controlled duration t if the first device needs to keep in a running state such that the coordinator controls the first device, and the first device may discard the wake-up broadcast frame if the first device does not need to keep in a running state. In this way, energy-saving implemented on a device is ensured and wake-up efficiency is improved such that channel utilization and performance of the LR-WPAN are improved.

Referring to FIG. 4, FIG. 4 is a schematic structural diagram of an FFD according to an embodiment of the present disclosure. The FFD 40 is applied to an LR-WPAN using a star networking mode, and the FFD 40 includes a generation module 401 and a sending module 402.

The FFD 40 serves as a coordinator in the LR-WPAN to implement the method for waking up devices in batches shown in FIG. 1 in the present disclosure.

The generation module 401 is configured to generate a wake-up broadcast frame, where the wake-up broadcast frame includes a wake-up indication field, and the wake-up indication field instructs multiple devices in the LR-WPAN to keep in a running state.

The sending module 402 is configured to send the wake-up broadcast frame at a time interval T2 within duration T1, where T1 is not less than a sum of T3 and T4, T2 is not greater than T4, T3 is maximum hibernation duration of the multiple devices, and T4 is a minimum running time window of the multiple devices.

The multiple devices are devices in the LR-WPAN except the FFD 40. The multiple devices are generally RFDs, or certainly may be FFDS, for example, FFDs having a relatively high energy-saving requirement.

all other devices in the LR-WPAN different from the coordinator receive the wake-up broadcast frame when the coordinator sends the wake-up broadcast frame. In this embodiment of the present disclosure, the wake-up broadcast frame generated by the coordinator includes a wake-up indication field, which wakes up the multiple devices in the LR-WPAN directionally, and instructs the multiple devices to keep in a running state. Further, the multiple devices may respectively keep running within corresponding running time windows, or may keep running according to a preset wake-up holding time. The preset wake-up holding time may be preconfigured on each device in the LR-WPAN, and may be related to a service deployed in the LR-WPAN network. Then, the coordinator may control the multiple devices in order to resolve a problem that energy-saving cannot be achieved in an existing broadcast mode in which a device that does not need to be controlled is woken up.

Generally, an ID is allocated to each device in the LR-WPAN, and is used for communication in the LR-WPAN. According to a scale and deployment of the LR-WPAN, a bit quantity of an ID may be 4 bits, 8 bits, 16 bits, or the like. That a bit quantity of an ID is 16 bits is used as an example. 0x0000 is an invalid ID, and 0xFFFF is a broadcast ID. A value range of an ID of a device in the LR-WPAN is 0x0001 to 0xFFFE. An ID of the coordinator may be set fixedly, for example, 0x0001. IDs of other devices different from the coordinator may be automatically allocated by the coordinator, or may be manually configured.

Assuming that the ID of the coordinator is 0x0001, values of the IDs of the other devices in the LR-WPAN are different from the coordinator range from 0x0002 to 0xFFFE.

In a first possible implementation manner, the wake-up indication field includes a wake-up indication bit corresponding to each ID that can be allocated to the devices in the LR-WPAN. A quantity of wake-up indication bits is the same as a quantity of IDs within the value range of the IDs that can be allocated to the devices in the LR-WPAN. Further, if the bit quantity of the ID of the device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the $254^{th}$ bits are respectively corresponding to the IDs 0x01 to 0xFE, that is, the first bit corresponds to an ID 0x01, the second bit corresponds to an ID 0x02, ..., and the $254^{th}$ bit corresponds to an ID 0xFE. Further, a wake-up indication bit whose value is 1 may indicate a device corresponding to the wake-up indication bit and that needs to be woken up, and a wake-up indication bit whose value is 0 may indicate a device corresponding to the wake-up indication bit and that does not need to be woken up. A wake-up indication bit corresponding to the ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may indicate a device that does not need to be woken up. A wake-up indication bit corresponding to the ID of the coordinator may be always set to 1. Alternatively, the wake-up indication field may include only 253 wake-up indication bits if the ID of the coordinator is set to 0x01 fixedly. The first to the $253^{th}$ bits are respectively corresponding to IDs 0x02 to 0xFE.

In a second possible implementation manner, the wake-up indication field is in TLV format and includes IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

The FFD 40 may further include a determining module (not shown) configured to determine the IDs of the multiple devices.

The generation module 401 is further configured to generate the wake-up broadcast frame according to the IDs of the multiple devices. The foregoing first possible implementation manner or the foregoing second possible implementation manner is used for the wake-up indication field in the wake-up broadcast frame.

The FFD 40 may further support both the foregoing first possible implementation manner and the foregoing second possible implementation manner. The generation module 401 is further configured to determine the wake-up indication field according to a preset condition, that is, choose to set the foregoing first possible implementation manner or the foregoing second possible implementation manner. The preset condition includes setting the first possible implementation manner when a quantity of the multiple devices that need to be woken up is greater than a preset threshold, that is, determining that the wake-up indication field includes the wake-up indication bit corresponding to each ID within the ID value range of the devices in the LR-WPAN, and setting the second possible implementation manner when a quantity of the multiple devices that need to be woken up is not greater than a preset threshold, that is, determining that the wake-up indication field is in TLV format and includes the IDs of the multiple devices. The preset threshold may be $2^n/n$, where n is a bit quantity of an ID in the LR-WPAN. For example, the preset threshold is set to 32 when the bit quantity of the ID in the LR-WPAN is 8 bits. In this case, the first possible implementation manner is set when the quantity of the devices that need to be woken up is greater than 32. The second possible implementation manner is set when the preset threshold is set to less than or equal to 32. In this way, when few devices need to be woken up, TLV directly carries the IDs of the devices that need to be woken up such that a length of the broadcast frame can be reduced, channel resource occupation can be reduced, and device processing efficiency can also be improved. Certainly, the preset threshold may not be set to $2^n/n$, and may also be set to a larger or smaller numeric value.

Optionally, the generation module 401 is further configured to generate the wake-up broadcast frame according to the IDs of the multiple devices and the preset condition. The foregoing first possible implementation manner or the foregoing second possible implementation manner is used for the wake-up indication field according to the preset condition.

The sending module 402 is configured to send the wake-up broadcast frame at the time interval T2 within the duration T1, where T1 is not less than the sum of T3 and T4, T2 is not greater than T4, T3 is the maximum hibernation duration of the multiple devices, and T4 is the minimum running time window of the multiple devices.

A low power-consumption RFD hibernates for a long time and runs for a short time, and the coordinator does not determine when each of the multiple devices hibernates or runs. Therefore, to ensure that all of the multiple devices can receive the wake-up broadcast frame and can be woken up, the coordinator first determines the duration T1 and the time interval T2 according to the multiple devices. T1 is not less than the sum of T3 and T4, T2 is not greater than T4, T3 is the maximum hibernation duration of the multiple devices, and T4 is the minimum running time window of the multiple devices. Then, the coordinator sends the wake-up broadcast frame at the time interval T2 within the duration T1. In this way, regardless of when each of the multiple devices runs, it can be ensured that the multiple devices receive the wake-up broadcast frame within the running time windows and are woken up.

Optionally, the determining module is further configured to determine the duration T1 and the time interval T2 according to the multiple devices.

For example, the FFD 40 needs to control 200 devices. Maximum hibernation duration of the 200 devices is 5 minutes, that is, T3 is 5 minutes. A minimum running time window of the 200 devices is 50 milliseconds, that is, T4 is 50 milliseconds. In this case, the duration T1 in which the FFD 40 sends the wake-up broadcast frame is not less than the sum of T3 and T4, for example, the duration T1 may be 6 minutes. The time interval T2 for the FFD 40 to send the wake-up broadcast frame is not greater than T4, for example, the time interval T2 may be 40 milliseconds. In this way, the FFD 40 continually sends the wake-up broadcast frame at the time interval T2 (40 milliseconds) within the duration T1

(6 minutes), which can ensure that the multiple devices receive the wake-up broadcast frame within the running time windows and are woken up.

The FFD 40 may further include a control processing module (not shown) configured to control the multiple devices when the duration T1 expires. Further, the control processing module may perform batch control on the multiple devices in broadcast mode, for example, performing batch upgrading or querying for data in batches, or the control processing module may separately control the multiple devices in unicast mode, for example, updating data.

Optionally, when the coordinator needs to separately control the multiple devices in unicast mode, the wake-up broadcast frame further includes a controlled duration t. The controlled duration t instructs the multiple devices to keep running for the controlled duration t. The generation module 401 is further configured to obtain the controlled duration t, where the controlled duration t is not less than T4.

The controlled duration t is related to service control duration of a service of the multiple devices that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN.

The generation module 401 is further configured to obtain the controlled duration t according to the preset service control duration and the quantity of the multiple devices, where the controlled duration t is the product of the preset service control duration and the quantity of the multiple devices.

According to the FFD 40 provided in this embodiment of the present disclosure, the FFD 40 sends, at a time interval T2 within duration T1, a wake-up broadcast frame including a wake-up indication field, to wake up multiple devices directionally using a broadcast wake-up mechanism similar to a multicast mode, and to instruct the multiple devices to keep in a running state such that the FFD 40 controls the multiple devices. In this way, a wake-up time can be shortened and wake-up efficiency can be improved compared with a unicast or broadcast mode. In addition, a device that does not need to be controlled is prevented from being woken up in broadcast mode, and energy-saving implemented on a device is ensured such that channel utilization and performance of the LR-WPAN are improved.

Figure 5:
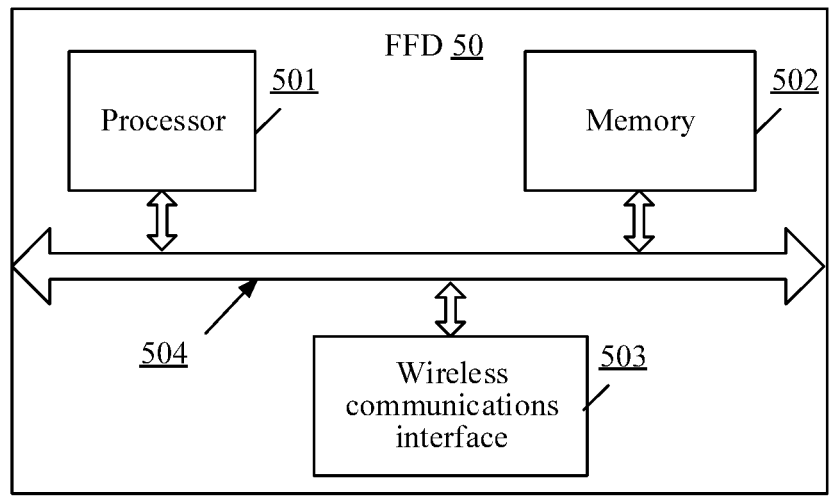
FIG. 5 is another schematic structural diagram of an FFD according to an embodiment of the present disclosure.

Referring to FIG. 5, FIG. 5 is another schematic structural diagram of an FFD according to an embodiment of the present disclosure. The FFD 50 is applied to an LR-WPAN using a star networking mode. The FFD 50 includes a processor 501, a memory 502, a wireless communications interface 503, and a bus 504.

The FFD 50 serves as a coordinator in the LR-WPAN to implement the method for waking up devices in batches shown in FIG. 1 in the present disclosure.

The processor 501, the memory 502, and the wireless communications interface 503 are connected to each other using the bus 504. The bus 504 may be a peripheral component interconnect (PCI) bus, an extended industry standard architecture (EISA) bus, a Serial Peripheral Interface (SPI), or the like. For ease of representation, the bus is represented using one thick line in FIG. 5, which, however, does not mean that there is only one bus or only one type of bus.

The wireless communications interface 503 is configured to receive and send a wireless radio frequency signal.

The memory 502 is configured to store a program. Further, the program may include program code, where the program code includes a computer operation instruction. The memory 502 may include a random access memory (RAM), and may also include a non-volatile memory, for example, at least one magnetic disk memory.

The processor 501 executes the program stored in the memory 502 to implement the methods for waking up devices in batches provided in the embodiments of the present disclosure, including generating a wake-up broadcast frame, where the wake-up broadcast frame includes a wake-up indication field, and the wake-up indication field instructs multiple devices in the LR-WPAN to keep in a running state, and sending the wake-up broadcast frame at a time interval T2 within duration T1, wherein T1 is not less than a sum of T3 and T4, T2 is not greater than T4, T3 is maximum hibernation duration of the multiple devices, and T4 is a minimum running time window of the multiple devices.

Generally, an ID is allocated to each device in the LR-WPAN, and is used for communication in the LR-WPAN. According to a scale and deployment of the LR-WPAN, a bit quantity of an ID may be 4 bits, 8 bits, 16 bits, or the like. That a bit quantity of an ID is 16 bits is used as an example. 0x0000 is an invalid ID, and 0xFFFF is a broadcast ID. A value range of an ID of a device in the LR-WPAN is 0x0001 to 0xFFFE. An ID of the coordinator may be set fixedly, for example, 0x0001. IDs of other devices different from the coordinator may be automatically allocated by the coordinator, or may be manually configured. Assuming that the ID of the coordinator is 0x0001, values of the IDs of the other devices in the LR-WPAN different from the coordinator range from 0x0002 to 0xFFFE.

All other devices in the LR-WPAN different from the coordinator receive the wake-up broadcast frame when the coordinator sends the wake-up broadcast frame. In this embodiment of the present disclosure, the wake-up broadcast frame generated by the coordinator includes a wake-up indication field, which wakes up the multiple devices in the LR-WPAN directionally, and instructs the multiple devices to keep in a running state. Further, the multiple devices may respectively keep running within corresponding running time windows, or may keep running according to a preset wake-up holding time. The preset wake-up holding time may be preconfigured on each device in the LR-WPAN, and may be related to a service deployed in the LR-WPAN network. Then, the coordinator may control the multiple devices in order to resolve a problem that energy-saving cannot be achieved in an existing broadcast mode in which a device that does not need to be controlled is woken up.

Optionally, before generating a wake-up broadcast frame, the method further includes determining IDs of the multiple devices. Correspondingly, generating a wake-up broadcast frame includes generating the wake-up broadcast frame according to the IDs of the multiple devices. The following first possible implementation manner or the following second possible implementation manner is used for the wake-up indication field in the wake-up broadcast frame.

Before sending the wake-up broadcast frame, the method further includes determining the duration T1 and the time interval T2 according to the multiple devices. A low power-consumption RFD hibernates for a long time and runs for a short time, and the coordinator does not determine when each of the multiple devices hibernates or runs. To ensure that all of the multiple devices can receive the wake-up broadcast frame and can be woken up, the FFD 50 first determines the duration T1 and the time interval T2 according to the multiple devices. Then, the FFD 50 sends the wake-up broadcast frame at the time interval T2 within the duration T1. In this way, regardless of when each of the multiple devices runs, it can be ensured that the multiple devices receive the wake-up broadcast frame within the running time windows and are woken up.

In a first possible implementation manner, the wake-up indication field includes a wake-up indication bit corresponding to each ID that can be allocated to the devices in the LR-WPAN. A quantity of wake-up indication bits is the same as a quantity of IDs within the value range of the IDs that can be allocated to the devices in the LR-WPAN. Further, if the bit quantity of the ID of the device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the 254th bits are respectively corresponding to the IDs 0x01 to 0xFE, that is, the first bit corresponds to an ID 0x01, the second bit corresponds to an ID 0x02, ..., and the 254th bit corresponds to an ID 0xFE. Further, a wake-up indication bit whose value is 1 may indicate a device corresponding to the wake-up indication bit and that needs to be woken up, and a wake-up indication bit whose value is 0 may indicate a device corresponding to the wake-up indication bit and that does not need to be woken up. A wake-up indication bit corresponding to the ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may indicate a device that does not need to be woken up. A wake-up indication bit corresponding to the ID of the coordinator may be always set to 1. Alternatively, if the ID of the coordinator is set to 0x01 fixedly, the wake-up indication field may include only 253 wake-up indication bits. The first to the 253th bits are respectively corresponding to IDs 0x02 to 0xFE.

In a second possible implementation manner, the wake-up indication field is in TLV format and includes the IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

Further, the FFD 50 may support both the foregoing first possible implementation manner and the foregoing second possible implementation manner. Before the FFD 50 generates and sends the wake-up broadcast frame, the method further includes determining, by the coordinator, the wake-up indication field according to a preset condition, that is, choosing to set the foregoing first possible implementation manner or the foregoing second possible implementation manner. The preset condition includes setting the first possible implementation manner when a quantity of the multiple devices that need to be woken up is greater than a preset threshold, that is, determining that the wake-up indication field includes the wake-up indication bit corresponding to each ID within the ID value range of the devices in the LR-WPAN, and setting the second possible implementation manner when a quantity of the multiple devices that need to be woken up is not greater than a preset threshold, that is, determining that the wake-up indication field is in TLV format and includes the IDs of the multiple devices. The preset threshold may be 2n/n, where n is a bit quantity of an ID in the LR-WPAN. For example, the preset threshold is set to 32 when the bit quantity of the ID in the LR-WPAN is 8 bits. In this case, the first possible implementation manner is set when the quantity of the devices that need to be woken up is greater than 32. The second possible implementation manner is set when the preset threshold is set to less than or equal to 32. In this way, when few devices need to be woken up, TLV directly carries the IDs of the devices that need to be woken up such that a length of the broadcast frame can be reduced, channel resource occupation can be reduced, and device processing efficiency can also be improved. Certainly, the preset threshold may not be set to 2n/n, and may also be set to a larger or smaller numeric value.

Further optionally, generating a wake-up broadcast frame according to the IDs of the multiple devices includes generating the wake-up broadcast frame according to the IDs of the multiple devices and the preset condition. The foregoing first possible implementation manner or the foregoing second possible implementation manner is set for the wake-up indication field according to the preset condition.

Further, the method may include controlling the multiple devices when the duration T1 expires. Further, batch control may be performed on the multiple devices in broadcast mode, for example, performing batch upgrading or querying for data in batches, or the multiple devices may be separately controlled in unicast mode, for example, updating data.

Optionally, the wake-up broadcast frame further includes a controlled duration t when the coordinator needs to separately control the multiple devices in unicast mode. The controlled duration t instructs the multiple devices to keep running for the controlled duration t, and the controlled duration t is not less than T4.

Before generating a wake-up broadcast frame, the method further includes obtaining, by the coordinator, the controlled duration t.

The controlled duration t is related to service control duration of a service that is of the multiple devices and that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN.

Further, obtaining the controlled duration t includes obtaining the controlled duration t according to the preset service control duration and the quantity of the multiple devices, where the controlled duration t is the product of the preset service control duration and the quantity of the multiple devices.

Optionally, if a device of the multiple devices is still not woken up, the FFD 50 uses the device of the multiple devices still not woken up as a new to-be-controlled device in order to generate a new wake-up broadcast frame.

The processor 501 may be a general-purpose processor, including a central processing unit (CPU), a network processor (NP), or the like. Alternatively, the processor 501 may be a digital signal processor (DSP), an application-specific integrated circuit (ASIC), a field programmable gate array (FPGA) or another programmable logic device, a discrete gate or a transistor logic device, or a discrete hardware component.

According to the FFD 50 provided in this embodiment of the present disclosure, the FFD 50 sends, at a time interval T2 within duration T1, a wake-up broadcast frame including a wake-up indication field, to wake up multiple devices directionally using a broadcast wake-up mechanism similar to a multicast mode, and to instruct the multiple devices to keep in a running state such that the FFD 50 controls the multiple devices. In this way, a wake-up time can be shortened and wake-up efficiency can be improved compared with a unicast or broadcast mode. In addition, a device that does not need to be controlled is prevented from being woken up in broadcast mode, and energy-saving implemented on a device is ensured such that channel utilization and performance of the LR-WPAN are improved.

A person skilled in the art may understand that, only a partial structure of the FFD related to the present disclosure is described in this embodiment of the present disclosure. The FFD may further include more components than those shown in the figure, or may be in different component arrangement.

Figure 6:
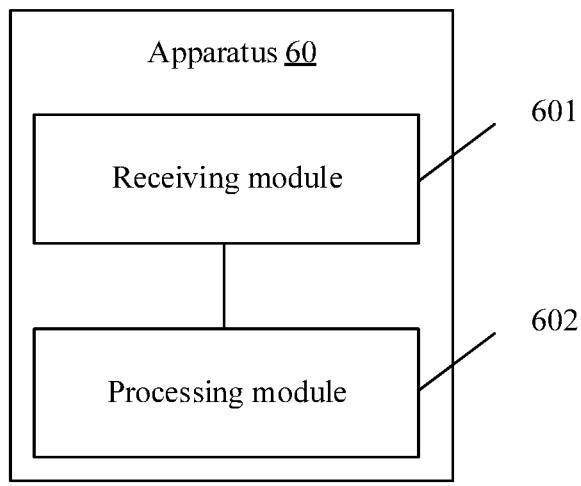
FIG. 6 is a block diagram of an apparatus for waking up devices in batches according to an embodiment of the present disclosure.

Referring to FIG. 6, FIG. 6 is a block diagram of an apparatus for waking up devices in batches according to an embodiment of the present disclosure. The apparatus 60 is configured to implement the other method for waking up devices in batches shown in FIG. 3 in the present disclosure. The apparatus 60 for waking up devices in batches includes a receiving module 601 and a processing module 602.

The receiving module 601 is configured to receive a wake-up broadcast frame sent by a coordinator, where the wake-up broadcast frame includes a wake-up indication field, and the wake-up indication field instructs multiple devices in the LR-WPAN to keep in a running state.

The multiple devices are devices in the LR-WPAN except the coordinator, for example, the multiple devices may be RFDs or FFDs. The apparatus 60 for waking up devices in batches is deployed on a first device of the multiple devices. The first device may be an RFD, or may be an FFD. That is, the apparatus 60 for waking up devices in batches may be deployed on an RFD, or may be deployed on an FFD.

The processing module 602 is configured to enable the first device to keep in a running state if determining, according to the wake-up indication field, that the first device needs to be woken up.

Further, the processing module 602 may be configured to enable the first device to keep running within a running time window of the first device, or keep running according to a preset wake-up holding time. The preset wake-up holding time may be preconfigured on each device in the LR-WPAN, and may be related to a service deployed in the LR-WPAN network.

The processing module 602 is further configured to discard the wake-up broadcast frame if determining, according to the wake-up indication field, that the first device does not need to be woken up, and enable the first device to enter a hibernation state again after a running time window of the first device expires.

The processing module 602 is further configured to determine, according to the wake-up indication field in the wake-up broadcast frame, whether the first device needs to be woken up. If the processing module 602 determines, according to the wake-up indication field, that the first device does not need to be woken up, the processing module 602 may discard the wake-up broadcast frame, and enable the first device to enter a hibernation state again after the running time window of the first device expires. If the processing module 602 determines, according to the wake-up indication field, that the first device needs to be woken up, enable the first device to keep in a running state.

Optionally, the wake-up broadcast frame further includes a controlled duration t, which instructs the multiple devices to keep running for the controlled duration t. The controlled duration t is generally not less than a minimum running time window of the multiple devices. In this embodiment of the present disclosure, the wake-up broadcast frame further includes the controlled duration t when the coordinator needs to separately control the multiple devices in unicast mode. The controlled duration t is related to service control duration of a service of the multiple devices and that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN. Certainly, in another case, the coordinator may alternatively add the controlled duration t to the wake-up broadcast frame.

Optionally, the processing module 602 is further configured to obtain the controlled duration t from the wake-up broadcast frame.

In a first possible implementation manner, the wake-up indication field includes a wake-up indication bit corresponding to each ID that can be allocated to the devices in the LR-WPAN. A quantity of wake-up indication bits is the same as a quantity of IDs within a value range of the IDs that can be allocated to the devices in the LR-WPAN. Further, if a bit quantity of an ID of a device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the 254th bits are respectively corresponding to the IDs 0x01 to 0xFE, that is, the first bit corresponds to an ID 0x01, the second bit corresponds to an ID 0x02, . . . , and the 254th bit corresponds to an ID 0xFE. Further, a wake-up indication bit whose value is 1 may indicate a device corresponding to the wake-up indication bit and that needs to be woken up, and a wake-up indication bit whose value is 0 may indicate a device corresponding to the wake-up indication bit and that does not need to be woken up. A wake-up indication bit corresponding to an ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may indicate a device that does not need to be woken up. A wake-up indication bit corresponding to an ID of the coordinator may be always set to 1. Alternatively, the wake-up indication field may include only 253 wake-up indication bits if an ID of the coordinator is set to 0x01 fixedly. The first to the 253th bits are respectively corresponding to IDs 0x02 to 0xFE.

In a second possible implementation manner, the wake-up indication field is in TLV format and includes IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

Optionally, the processing module 602 is further configured to wait, within the controlled duration t, for control to be performed by the coordinator, for example, upgrading, time synchronization, data querying, or data updating.

The processing module 602 is further configured to enable the first device to enter a hibernation state again when the running time window of the first device or the controlled duration t expires, and if the first device is not in communication. After the last time when the first device receives the wake-up broadcast frame, the first device enters a hibernation state again when the running time window of the first device or the controlled duration t expires, and if the first device is not in communication.

For other details not described in this embodiment, refer to the description of the embodiment shown in FIG. 3 in the present disclosure.

The apparatus for waking up devices in batches provided in this embodiment of the present disclosure determines, after receiving a wake-up broadcast frame sent by a coordinator in an LR-WPAN and according to a wake-up indication field in the wake-up broadcast frame, whether a first device needs to keep in a running state. The first device keeps running for a period, for example, the controlled duration t if the first device needs to keep in a running state such that the coordinator controls the first device, and the apparatus may discard the wake-up broadcast frame if the first device does not need to keep in a running state. In this way, energy-saving implemented on a device is ensured and wake-up efficiency is improved such that channel utilization and performance of the LR-WPAN are improved.

Figure 7:
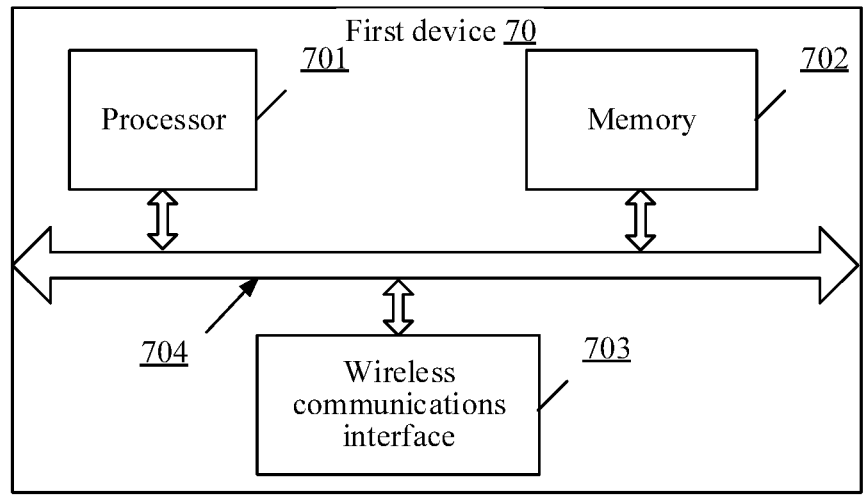
FIG. 7 is a schematic structural diagram of a first device according to an embodiment of the present disclosure.

Referring to FIG. 7, FIG. 7 is a schematic structural diagram of a first device according to an embodiment of the present disclosure. The first device 70 is applied to an LR-WPAN using a star networking mode, and is configured to implement the other method for waking up devices in batches shown in FIG. 3 in the present disclosure. The first device 70 includes a processor 701, a memory 702, a wireless communications interface 703, and a bus 704.

The first device may be an RFD or an FFD.

The processor 701, the memory 702, and the wireless communications interface 703 are connected to each other using the bus 704. The bus 704 may be a PCI bus, an EISA bus, an SPI bus, or the like. The bus may be classified into an address bus, a data bus, a control bus, and the like. For ease of representation, the bus is represented using one thick line in FIG. 7, which, however, does not mean that there is only one bus or only one type of bus.

The wireless communications interface 703 is configured to receive and send a wireless radio frequency signal.

The memory 702 is configured to store a program. Further, the program may include program code, where the program code includes a computer operation instruction. The memory 702 may include a RAM, and may also include a non-volatile memory.

The wireless communications interface 703 is further configured to receive a wake-up broadcast frame sent by a coordinator, where the wake-up broadcast frame includes a wake-up indication field, and the wake-up indication field instructs multiple devices in the LR-WPAN to keep in a running state.

The processor 701 executes the program stored in the memory 702 to implement the methods for waking up devices in batches provided in the embodiments of the present disclosure, including determining, according to the wake-up indication field, whether the first device needs to be woken up, keeping, by the first device, in a running state if determining, according to the wake-up indication field, that the first device needs to be woken up, and discarding, by the first device, the wake-up broadcast frame if determining, according to the wake-up indication field, that the first device does not need to be woken up, and entering, by the first device, a hibernation state again after a running time window of the first device expires.

Further, the first device may keep running within the running time window of the first device, or may keep running according to a preset wake-up holding time. The preset wake-up holding time may be preconfigured on each device in the LR-WPAN, and may be related to a service deployed in the LR-WPAN network.

In a first possible implementation manner, the wake-up indication field includes a wake-up indication bit corresponding to each ID that can be allocated to the devices in the LR-WPAN. A quantity of wake-up indication bits is the same as a quantity of IDs within a value range of the IDs that can be allocated to the devices in the LR-WPAN. Further, if a bit quantity of an ID of a device in the LR-WPAN is 8 bits, except an invalid ID 0x00 and a broadcast ID 0xFF, there are 254 IDs that can be allocated to the devices in the LR-WPAN, that is, 0x01 to 0xFE. In this case, the wake-up indication field includes 254 wake-up indication bits. The first to the 254th bits are respectively corresponding to the IDs 0x01 to 0xFE, that is, the first bit corresponds to an ID 0x01, the second bit corresponds to an ID 0x02, . . . , and the 254th bit corresponds to an ID 0xFE. Further, a wake-up indication bit whose value is 1 may indicate a device corresponding to the wake-up indication bit and that needs to be woken up, and a wake-up indication bit whose value is 0 may indicate a device corresponding to the wake-up indication bit and that does not need to be woken up. A wake-up indication bit corresponding to an ID of the coordinator may be always set to 0. For example, if the coordinator needs to wake up four devices whose IDs are 0x11, 0x15, 0x43, and 0x78, as shown in FIG. 2A, values of wake-up indication bits corresponding to the IDs of the four devices are 1, and values of wake-up indication bits corresponding to IDs of the other devices that do not need to be woken up are 0. Certainly, alternatively, a wake-up indication bit whose value is 0 may indicate a device that needs to be woken up, and a wake-up indication bit whose value is 1 may indicate a device that does not need to be woken up. A wake-up indication bit corresponding to an ID of the coordinator may be always set to 1. Alternatively, the wake-up indication field may include only 253 wake-up indication bits if an ID of the coordinator is set to 0x01 fixedly. The first to the 253th bits are respectively corresponding to IDs 0x02 to 0xFE.

In a second possible implementation manner, the wake-up indication field is in TLV format and includes IDs of the multiple devices that need to be woken up. Further, if the coordinator needs to wake up four devices whose IDs are 0x11, 0x15, 0x43, and 0x78, Value fields in the wake-up indication field include the four IDs (0x11, 0x15, 0x43, and 0x78). As shown in FIG. 2B, a Type field occupies 4 bits, a Length field occupies 4 bits, and Value fields include the four IDs with each occupying 8 bits.

Optionally, the wake-up broadcast frame further includes a controlled duration t, which instructs the multiple devices to keep running for the controlled duration t. The controlled duration t is generally not less than a minimum running time window of the multiple devices. In this embodiment of the present disclosure, when the coordinator needs to separately control the multiple devices in unicast mode, the wake-up broadcast frame further includes the controlled duration t. The controlled duration t is related to service control duration of a service of the multiple devices that needs to be controlled by the coordinator, and also related to a quantity of the multiple devices. The controlled duration t may be a product of the preset service control duration and the quantity of the multiple devices. For example, if the preset service control duration is 30 milliseconds, and the quantity of the first devices is 100, the controlled duration t is 3 seconds (100*30 milliseconds). The preset service control duration may be preconfigured on each device in the LR-WPAN. Certainly, in another case, the coordinator may alternatively add the controlled duration t to the wake-up broadcast frame.

Optionally, when the wake-up broadcast frame further includes the controlled duration t, the first device keeps running for the controlled duration t. The method further includes obtaining the controlled duration t from the wake-up broadcast frame.

Further, the method includes waiting, within the running time window of the first device or the controlled duration t, for control to be performed by the coordinator, for example, upgrading, time synchronization, data querying, or data updating.

The method further includes entering, by the first device, a hibernation state again when the running time window of the first device or the controlled duration t expires, and if the first device is not in communication. After the last time when the first device receives the wake-up broadcast frame, when the running time window of the first device or the controlled duration t expires, if the first device is not in communication, the first device enters a hibernation state again.

The processor 701 may be a general-purpose processor, including a CPU, an NP, or the like. Alternatively, the processor 701 may be a DSP, an ASIC, an FPGA or another programmable logic device, a discrete gate or a transistor logic device, or a discrete hardware component.

The first device provided in this embodiment of the present disclosure determines, after receiving a wake-up broadcast frame sent by a coordinator in an LR-WPAN and according to a wake-up indication field in the wake-up broadcast frame, whether the first device needs to keep in a running state. The first device keeps running for a period, for example, the controlled duration t if the first device needs to keep in a running state such that the coordinator controls the first device, and the first device may discard the wake-up broadcast frame if the first device does not need to keep in a running state. In this way, energy-saving implemented on a device is ensured and wake-up efficiency is improved such that channel utilization and performance of the LR-WPAN are improved.

A person skilled in the art may understand that, only a partial structure of the first device related to the present disclosure is described in this embodiment of the present disclosure. The first device may further include more components than those shown in the figure, or may be in different component arrangement.

Figure 8:
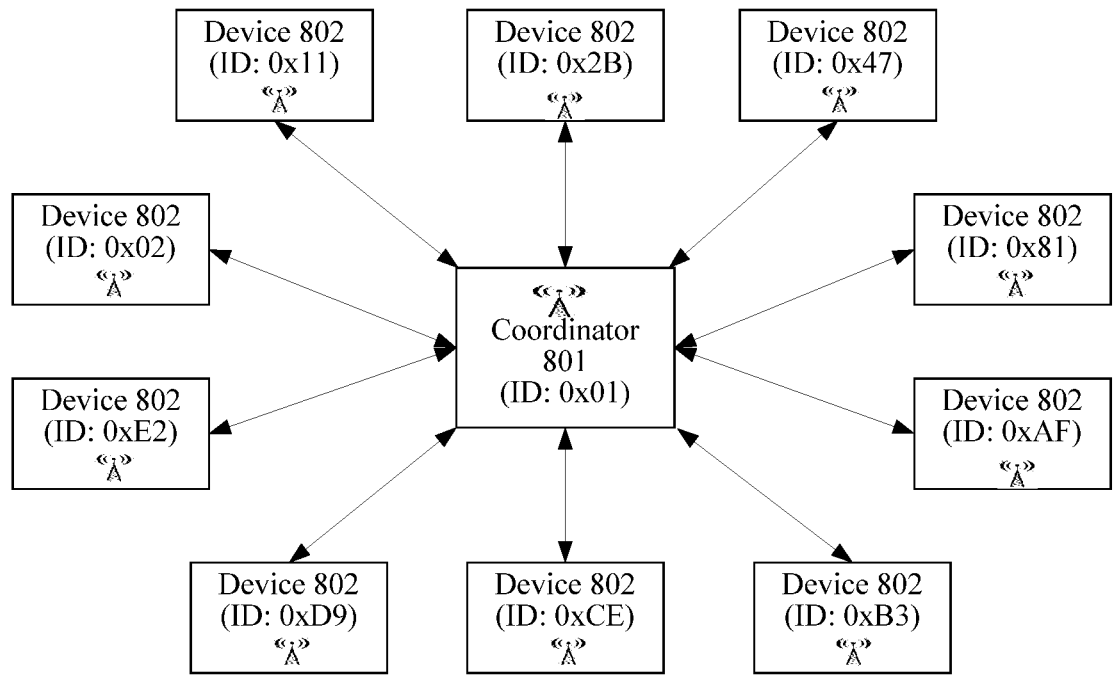
FIG. 8 is a schematic diagram of an LR-WPAN according to an embodiment of the present disclosure.

As shown in FIG. 8, FIG. 8 is a schematic diagram of an LR-WPAN using a star networking mode according to an embodiment of the present disclosure. The LR-WPAN includes a coordinator 801 and multiple devices 802. The coordinator 801 is an FFD. The devices 802 are devices other than coordinators and may be RFDs or FFDs, which is not limited in the present disclosure. The coordinator 801 is similar to the FFD 40 or the FFD 50 in the embodiments of the present disclosure. For specific details about a working principle, a structure, and a function of the coordinator 801, refer to the description of the embodiment shown in FIG. 4 or FIG. 5 in the present disclosure. Details are not described herein again. The devices 802 are similar to the apparatus 60 or the first device 70 in the embodiments of the present disclosure. For specific details about working principles, structures, and functions of the devices 802, refer to the description of the embodiment shown in FIG. 6 or FIG. 7 in the present disclosure. Details are not described herein again.

A person skilled in the art may understand that, only a partial structure of the LR-WPAN related to the present disclosure is described in this embodiment of the present disclosure. The LR-WPAN may further include more components than those shown in the figure, or may be in different component arrangement.

A person of ordinary skill in the art may understand that all or some of the steps of the method embodiments may be implemented by a program instructing relevant hardware. The corresponding program may be stored in a computer readable storage medium. The storage medium may include a RAM, a read-only memory (ROM), a flash memory, a hard disk, a solid state disk, or an optical disc.

The foregoing descriptions are merely examples of specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for waking up a plurality of devices in batches, applied to a low-rate wireless personal area network (LR-WPAN), comprising:
    generating, by a coordinator, a wake-up broadcast frame, wherein the wake-up broadcast frame comprises a wake-up indication field, and wherein the wake-up indication field instructs the plurality of devices in the LR-WPAN to keep in a running state; and
    sending, by the coordinator, the wake-up broadcast frame at a time interval (T2) within a duration (T1), wherein the T1 is not less than a sum of T3 and T4, wherein the T2 is not greater than the T4, wherein the T3 is maximum hibernation duration of the plurality of devices, and wherein the T4 is a minimum running time window of the plurality of devices.

2. The method according to claim 1, wherein the wake-up indication field comprises a wake-up indication bit corresponding to each identifier allocated to the plurality of devices in the LR-WPAN, or wherein the wake-up indication field is in type-length-value (TLV) format and comprises identifiers of the plurality of devices.

3. The method according to claim 2, wherein before generating the wake-up broadcast frame, the method further comprises:

determining that the wake-up indication field comprises the wake-up indication bit corresponding to each identifier allocated to the plurality of devices in the LR-WPAN when a quantity of the plurality of devices is greater than a preset threshold; and determining that the wake-up indication field is in the TLV format and comprises the identifiers of the plurality of devices when the quantity of the plurality of devices is not greater than the preset threshold.

4. The method according to claim 1, wherein the wake-up broadcast frame further comprises a controlled duration (t), wherein the t is not less than the T4, wherein before generating the wake-up broadcast frame, the method further comprises obtaining the t, and wherein the t instructs the plurality of devices to keep running for the t.

5. The method according to claim 4, wherein obtaining the t comprises obtaining the t according to a preset service control duration and a quantity of the plurality of devices, and wherein the t is a product of the preset service control duration and the quantity of the plurality of devices.

6. The method according to claim 1, further comprising controlling, by the coordinator, the plurality of devices after the T1 expires.

7. A method for waking up a plurality of devices in batches, applied to a low-rate wireless personal area network (LR-WPAN), comprising:

receiving, by a first device, a wake-up broadcast frame sent by a coordinator repeatedly within a duration (T1), wherein a time interval between receiving the wake-up broadcast frames is T2, wherein the T1 is not less than a sum of T3 and T4, wherein the T2 is not greater than T4, wherein the T3 is maximum hibernation duration of the plurality of devices, wherein the T4 is a minimum running time window of the plurality of devices, wherein the wake-up broadcast frame comprises a wake-up indication field, and wherein the wake-up indication field instructs the plurality of devices in the LR-WPAN to keep in a running state; and keeping, by the first device, in the running state when the first device determines according to the wake-up indication field, that the first device needs to be woken up.

8. The method according to claim 7, wherein when the first device determines according to the wake-up indication field, that the first device does not need to be woken up, the method further comprise:

discarding, by the first device, the wake-up broadcast frame; and entering a hibernation state after a running time window of the first device expires.

9. The method according to claim 7, wherein the wake-up indication field comprises a wake-up indication bit corresponding to each identifier allocated to the plurality of devices in the LR-WPAN, or wherein the wake-up indication field is in type-length-value (TLV) format and comprises identifiers of the plurality of devices.

10. The method according to claim 7, wherein the wake-up broadcast frame further comprises a controlled duration (t), wherein the t is not less than the T4, wherein the method further comprises obtaining the t from the wake-up broadcast frame, and wherein the first device keeps in the running state for the t according to the wake-up indication field and the t.

11. The method according to claim 10, further comprising entering, by the first device, a hibernation state when a running time window of the first device or the t expires, and when the first device is not in communication.

12. A full-function device (FFD), applied to a low-rate wireless personal area network (LR-WPAN), comprising:

a memory comprising instructions;

a processor coupled to the memory, wherein the instructions cause the processor to be configured to generate a wake-up broadcast frame, wherein the wake-up broadcast frame comprises a wake-up indication field, and wherein the wake-up indication field instructs a plurality of devices in the LR-WPAN to keep in a running state; and a transmitter coupled to the memory and the processor, wherein the transmitter is configured to send the wake-up broadcast frame at a time interval (T2) within a duration (T1), wherein the T1 is not less than a sum of T3 and T4, wherein the T2 is not greater than the T4, wherein the T3 is maximum hibernation duration of the plurality of devices, and wherein the T4 is a minimum running time window of the plurality of devices.

13. The FFD according to claim 12, wherein the wake-up indication field comprises a wake-up indication bit corresponding to each identifier allocated to the plurality of devices in the LR-WPAN, or wherein the wake-up indication field is in type-length-value (TLV) format and comprises identifiers of the plurality of devices.

14. The FFD according to claim 13, wherein the instructions further cause the processor to be configured to:

determine that the wake-up indication field comprises the wake-up indication bit corresponding to each identifier allocated to the plurality of devices in the LR-WPAN when a quantity of the plurality of devices is greater than a preset threshold; and determine that the wake-up indication field is in the TLV format and comprises the identifiers of the plurality of devices when the quantity of the plurality of devices is not greater than the preset threshold.

15. The FFD according to claim 12, wherein the wake-up broadcast frame further comprises controlled duration (t), wherein the t is not less than the T4, wherein the instructions further cause the processor to be configured to obtain the t, and wherein the t instructs the plurality of devices to keep running for the t.

16. The FFD according to claim 15, wherein the instructions further cause the processor to be configured to obtain the t according to a preset service control duration and a quantity of the plurality of devices, and wherein the t is a product of the preset service control duration and the quantity of the plurality of devices.

17. An apparatus for waking up a plurality of devices in batches, applied to a low-rate wireless personal area network (LR-WPAN), comprising:

a memory comprising instructions;

a receiver configured to receive a wake-up broadcast frame sent by a coordinator repeatedly within a duration (T1), wherein a time interval between receiving the wake-up broadcast frames is T2, wherein the T1 is not less than a sum of T3 and T4, wherein the T2 is not greater than T4, wherein the T3 is maximum hibernation duration of the plurality of devices, wherein the T4 is a minimum running time window of the plurality of devices, wherein the wake-up broadcast frame comprises a wake-up indication field, wherein the wake-up indication field instructs the plurality of devices in the LR-WPAN to keep in a running state, and wherein the apparatus for waking up the plurality of devices in batches is deployed on a first device of the plurality of devices; and a processor coupled to the memory and the receiver, wherein the instructions cause the processor to be configured to enable the first device to keep in the running state when determining according to the wake-up indication field, that the first device needs to be woken up.

18. The apparatus according to claim 17, wherein when determining according to the wake-up indication field, that the first device does not need to keep in a running state, the instructions further cause the processor to be configured to:
   discard the wake-up broadcast frame; and
   enable the first device to enter a hibernation state after a running time window of the first device expires.

19. The apparatus according to claim 18, wherein the wake-up indication field comprises a wake-up indication bit corresponding to each identifier allocated to the plurality of devices in the LR-WPAN.

20. The apparatus according to claim 18, wherein the wake-up indication field is in type-length-value (TLV) format and comprises identifiers of the plurality of devices.

* * * * *